United States Patent [19]
Blose

[11] 4,192,533
[45] Mar. 11, 1980

[54] DOVETAIL CONNECTION FOR PIN AND BOX JOINTS

[75] Inventor: Thomas L. Blose, Houston, Tex.

[73] Assignee: Hydril Company, Los Angeles, Calif.

[21] Appl. No.: 875,672

[22] Filed: Feb. 6, 1978

Related U.S. Application Data

[63] Continuation of Ser. No. 679,476, Apr. 22, 1976, abandoned.

[51] Int. Cl.² .............................................. F16L 25/00
[52] U.S. Cl. ..................................... 285/334; 285/355
[58] Field of Search ............... 285/333, 334, 355, 390, 285/347; 403/343

[56] References Cited

U.S. PATENT DOCUMENTS

| | | |
|---|---|---|
| 2,079,692 | 5/1937 | Lapointe ........................... 285/334 X |
| 2,211,179 | 8/1940 | Stone ................................... 285/334 |
| 3,100,656 | 8/1963 | MacArthur ...................... 285/333 X |
| 3,224,799 | 12/1965 | Blose et al. ......................... 285/334 |
| 3,508,771 | 4/1970 | Duret ................................... 285/334 |
| 3,667,784 | 6/1972 | Hokanson et al. ............... 285/334 X |

FOREIGN PATENT DOCUMENTS 262796  1/1971  U.S.S.R. ................................... 285/334

*Primary Examiner*—Dave W. Arola
*Attorney, Agent, or Firm*—William W. Haefliger

[57] ABSTRACT

Pipe joint pin and box members have interengageable two-step threads and interengageable annular shoulders for preventing radial and axial separation of the members.

8 Claims, 8 Drawing Figures

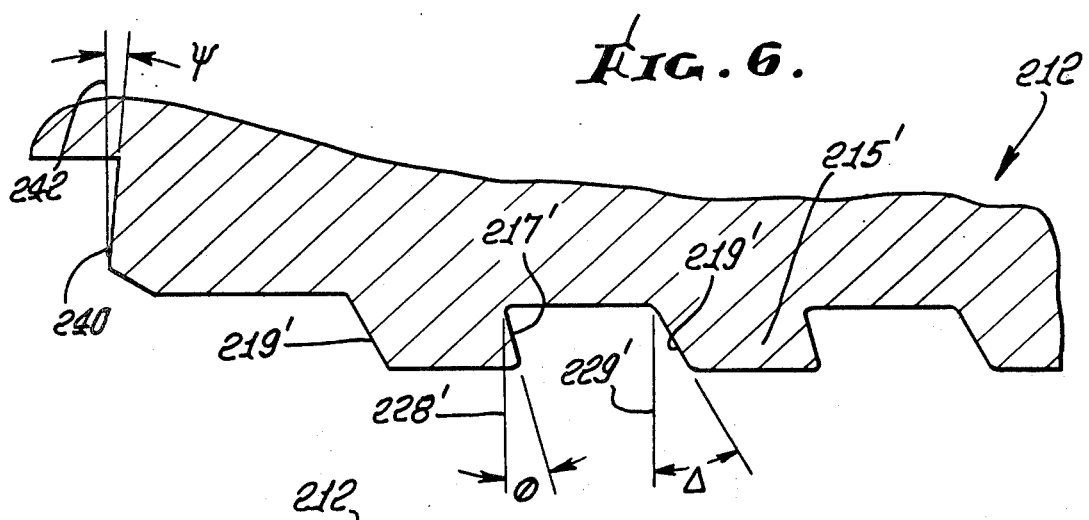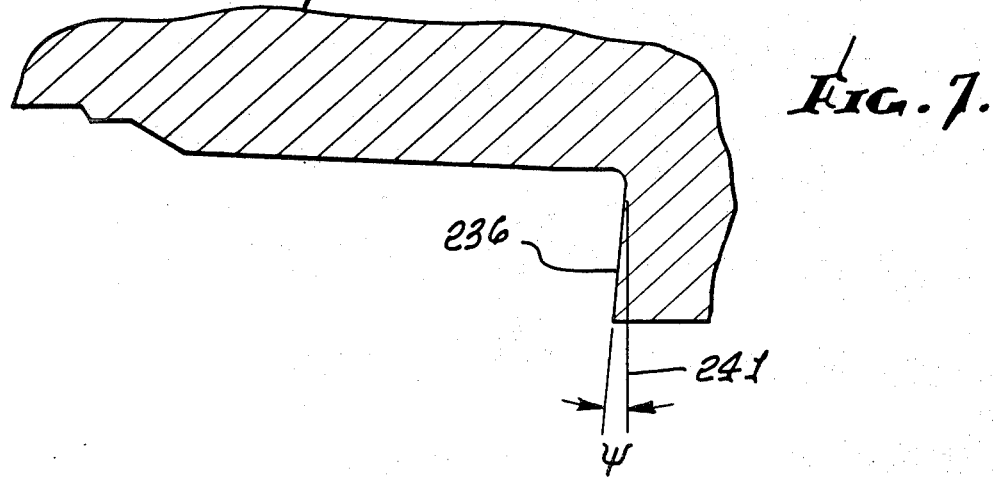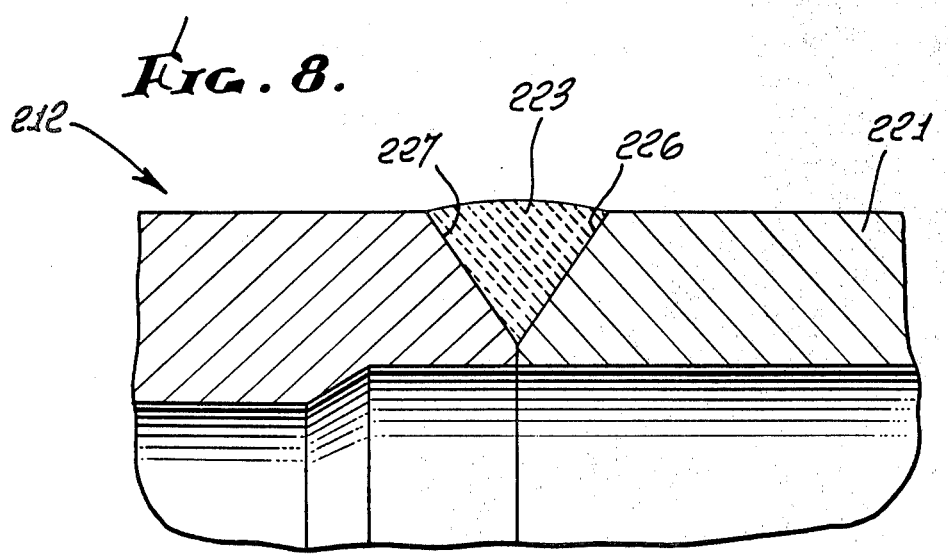

DOVETAIL CONNECTION FOR PIN AND BOX JOINTS

This is a continuation, of application Ser. No. 679,476, filed Apr. 22, 1976, and now abandoned.

BACKGROUND OF THE INVENTION

This invention relates generally to thread connected joints as usable in oil well tubing, casing, line pipe and drill pipe (all of which will be referred to as pipe, for convenience). More particularly, it concerns a means for connecting joint pin and box members in a manner to prevent axial and radial separation of the members.

With increased concern for protection of our environment, it is becoming more important that tubular joint connections used in the oil industry be capable of performing with maximum security under all conditions characteristic of the operating tasks they are relied upon to fulfill. Basic fundamental technology required to meet these performances must be satisfied through all operating stress or strain levels. Today there are no tubular connections produced anywhere in the world which will meet these requirements through all operating stress or strain conditions characteristic of services to which they may be exposed. In most cases, margins of safety are inherently smaller as severity of performance increases. There is a need for a connection that will have mechanical integrity which will not be weakened by load stresses or strains induced by tension, compression, internal pressure, external pressure, torsion, bending, thermal variances, or any combination of these until the material itself has failed by limitation of metallurgical properties in rupture or fracture.

SUMMARY OF THE INVENTION

It is a major object of the invention to provide a pipe joint whose members are interlocked at both threads and annular shoulders and wherein the members cannot separate radially due to internal or external pressure; also, the members cannot separate due to axially applied tension or compressive loads, without plastically deforming one or both joint members in the area of thread or shoulder interlocking. Basically, the invention is embodied in a pipe joint including pin and box members defining an axis, and including:

(a) first and second pairs of interengaged threads on the respective members, the first pair of threads axially spaced from the second pair of threads, and (b) a first pair generally frusto-conical shoulders on the members located axially between said frist and second pair of threads, said shoulders having dovetail interfit on make-up of the joint.

It is a further object to provide individual pin and box members characterized as forming a joint as described.

Further, and as will be seen, the joint may include a second pair of annular shoulders at the end of one of the members, such shoulders typically being closely spaced and frusto-conical to have dovetail interfit in the event of sufficient coining of the first pair of shoulders on make-up; and a third pair of frusto-conical closely spaced shoulders may be provided at the end of the other of the pin and box members to have dovetail interfit in the event of sufficient coining of the first pair of shoulders on joint make-up.

Further, the threads of the first and second pairs may have interengaged negative flanks, and positive flanks which remain disengaged.

These and other objects and advantages of the invention, as well as the details of illustrative embodiments, will be more fully understand from the following description and drawings, in which:

DRAWING DESCRIPTION

FIG. 1 is a section in an axial radial plane, through a pin member embodying the invention;

FIG. 2 is a section in an axial radial plane, through a box member embodying the invention;

FIG. 6 is an enlarged fragmentary section on line 6 of FIG. 2;

FIG. 7 is an enlarged fragmentary section on line 7 of FIG. 2; and

FIG. 8 is an enlarged fragmentary section on line 8 of FIG. 3.

DETAILED DESCRIPTION

Figure 3:
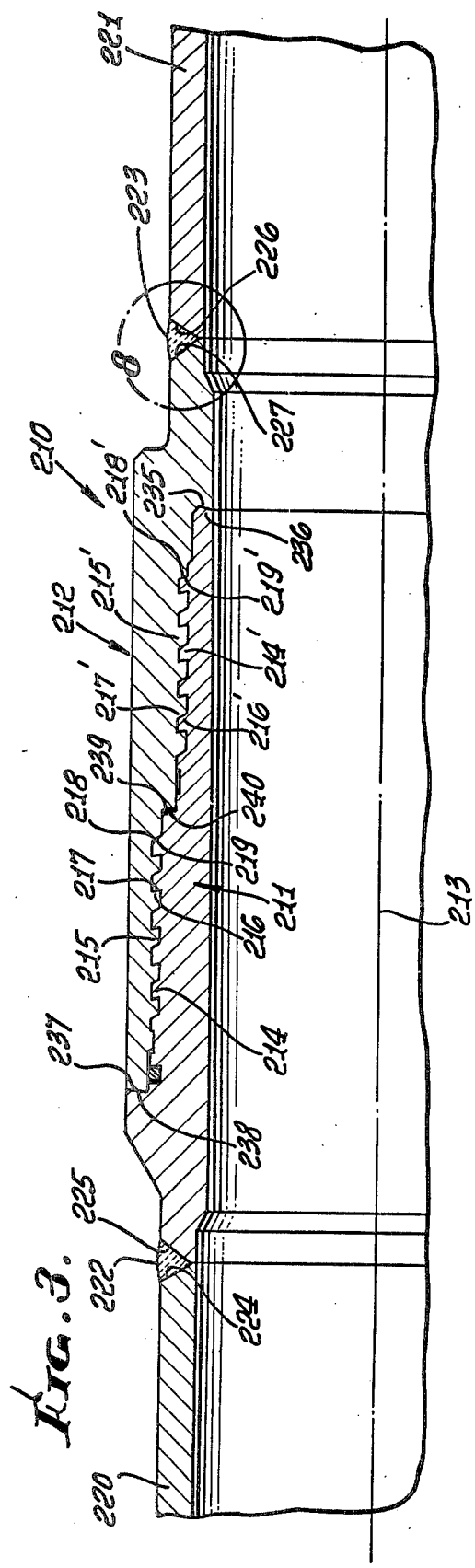
FIG. 3 is a section in an axial radial plane through a pipe joint embodying the invention.
Figure 5:
FIG. 5 is an enlarged fragmentary section on lines 5 of FIG. 1.
Figure 4:
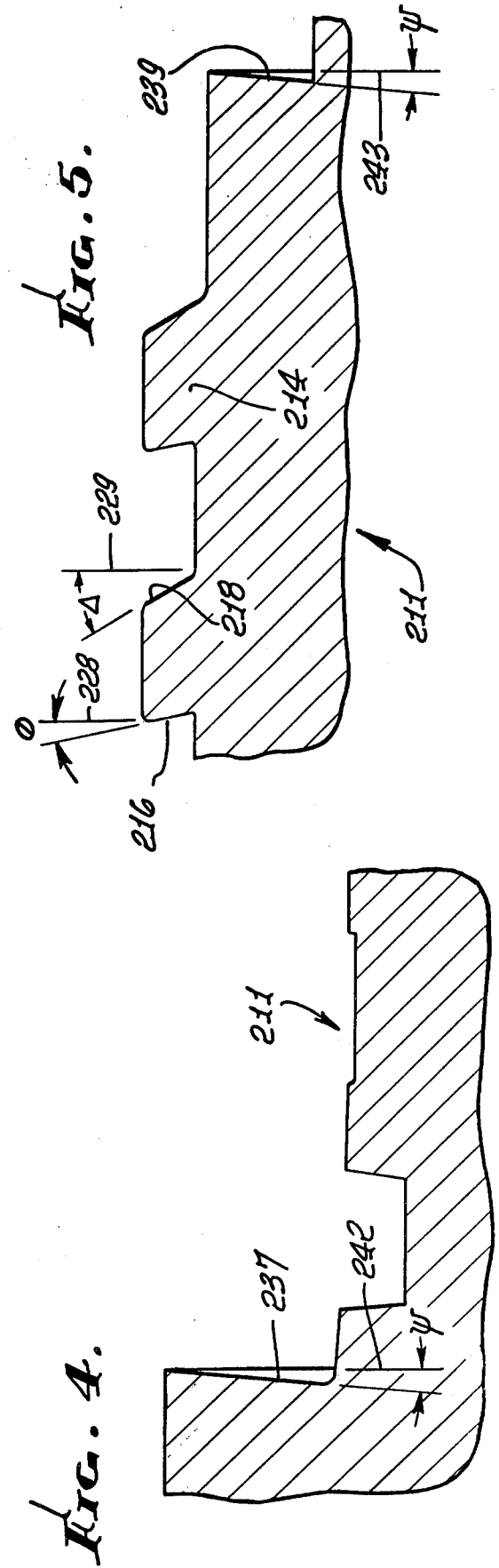
FIG. 4 is an enlarged fragmentary section on line 4 of FIG. 1.

Referring first to FIG. 3, a pipe joint 210 includes pin and box members 211 and 212, the joint defining an axis 213. Interengaged thread means on the members include first and second helical threading or threads 214 and 215, and third and fourth helical threads 214' and 215'. The first pair of threads 214 and 215 is axially spaced from the second pair of threads 214' and 215; also the pair 214 and 215 is at a greater radius from axis 213 than the pair 214' and 215', forming a two-step configuration.

The threads 214 and 215 have semi-dove-tail interfit as at flank 216 on thread 214 engaged with flank 217 on thread 215. Similarly, flank 216' on thread 214' engages with flank 217' on thread 215', to form a semi-dove-tail interfit. The opposite flanks 218 and 219 on the pin and box, and flanks 218' and 219', are typically not interengaged, there being about 0.020 inches clearance therebetween on normal make-up.

The pin and box members 211 and 212 may be respectively welded to pipe members 220 and 221, as for example drill pipe or tubing or casing used in oil wells. Annular welds are shown at 222 and 223, in FIG. 3, as having triangular cross sections in axial radial planes. Beveled surfaces on the pin, box and pipe members, adjacent the welds, appear at 224–227.

The interengaged flanks 216 and 217, as well as flanks 216' and 217', define negative angles $\phi$ in axial radial planes, those angles being respectively measured from other planes 228 and 228' normal to axis 213, as is clear in FIGS. 1, 2, 5 and 6. Typically, and for best results, the angle $\phi$ may be about $-15°$. Flanks 218 and 219, and 218' and 219' may extend at negative angles $\Delta$ which are greater than $\phi$, and may typically be about 30° as measured from other planes 229 and 229' normal to the joint axis 213.

In accordance with an important aspect of the invention, the joint also includes generally annular and preferably frusto conical parallel shoulders 239 and 240 on the pin and box members, such shoulders having pressure or sealing interfit in axially spaced relation from and intermediate the first and second thread pairs; also, the shoulders define dovetails in axial radial planes, and the dovetail angularity may advantageously be positive as measured from a plane or planes normal to the joint axis. Accordingly, shoulders 239 and 240 block radial and axial separation of the pin and box members, and they form a tight seal. Such planes appear at 241 and 242 in FIGS. 5 and 6.

As shown in FIGS. 1–3, a second pair of frusto-conical, parallel shoulders 235 and 236 may be respectively located at the end of the pin member and on the box member; and a third pair of frusto-conical, parallel shoulders 237 and 238 at the end of the box member and on the pin member. Shoulders 235 and 236 are spaced apart, as are shoulders 237 and 238, on normal make-up, the spacing being less than 0.020 inches and preferably about 0.015 inches. Note the positive semi-dovetail angularity $\psi$ of the three pairs of shoulders, as measured from planes 241–243 normal to axis 13. For best results, angle $\psi$ may be about 5°.

As a result, upon make-up of the joint, the first pair of annular shoulders 239 and 240 initially come into pressural and sealing interengagement and in conjunction with the interlocked threads prevent radial separation of the joint members and also prevent axial separation of the members. Should the axial make-up be excessive resulting in coining of shoulders 239 and 240, the second and third pairs of shoulders 235 and 236, and 237 and 238 will come into interengagement to assist in holding the pin and box members against radial and axial separation; i.e., the second and third shoulders act as safety means assuring positive interlocking and sealing of the pin and box members under all conditions of make-up in the field. Further, with the shoulder interlock as described, locking is provided throughout the connection, and the application of high make-up torque will have less tendency to separate the joint members as the shoulders coin or yield, because the adjacent interlocked threads resist the tendency of the shoulders to climb over one another to separate the joint members. This advantage is in addition to the resistance provided by the interlocked shoulders to fluid pressure induced separation of the members.

I claim:

1. In a tubular pin member adapted to be coupled to a tubular box member, thereby to form a joint having an axis,
   (a) first thread means on the pin member adapted to interfit second thread means on the box member, and third thread means on the pin member adapted to interfit fourth thread means on the box member, said first and third thread means defining a two-step thread,
   (b) a first frusto-conical make-up shoulder on the pin member located between said first and third thread means and adapted to interfit a corresponding first make-up shoulder on the box member,
   (c) said first and third thread means having flanks angled negatively in axial radial planes, and relative to planes normal to said axis and intersecting said flanks, said flanks facing in one axial direction being negatively angled to lesser extent than the flanks facing in the opposite axial direction, and
   (d) a second frusto-conical make-up shoulder on the pin member proximate the end of one of said first and third thread means remote from said first make-up shoulder, said first and second shoulders being positively angled in axial radial planes and relative to planes normal to said axis and intersecting said shoulders, said second shoulder on said pin member being adapted to be in a spaced relation from a corresponding second shoulder on the box member on normal make-up of said pin member to such box member, said second frusto-conical make-up shoulder on said pin member being adapted to engage the corresponding second shoulder on the box member in the event of sufficient coining of said first frusto-conical make-up shoulder on said pin member and of said corresponding first make-up shoulder on such box member.

2. The pin member of claim 1 wherein said first make-up shoulder on the pin member defines a positive angle of about 5° in said planes, said angle measured from another plane normal to said axis.

3. The pin member of claim 2 wherein said second frusto-conical make-up shoulder defines a positive angle of about 5° in said planes, said angle measured from another plane normal to said axis.

4. The pin member of claim 1 including a third frusto-conical make-up shoulder on the pin member which is positively angled in axial radial planes, said angle measured from another plane normal to said axis, said second and third shoulders located at the ends of the first and third thread means remote from said first make-up shoulder, said first, second and third shoulders defining approximately equal positive angles in axial radial planes and relative to planes normal to said axis and which intersect said shoulders.

5. In a tubular box member adapted to couple to a tubular pin member, thereby to form a joint,
   (a) second thread means on the box member adapted to interfit first thread means on the pin member, fourth thread means on the box member adapted to interfit third thread means on the pin member, said second and fourth thread means defining a two-step thread,
   (b) a first frusto-conical make-up shoulder on the box member located between said second and fourth thread means and adapted to interfit a corresponding first make-up shoulder on the pin member,
   (c) said second and fourth thread means having flanks angled negatively in axial radial planes, and relative to planes normal to said axis and intersecting said flanks, said flanks facing in one axial direction being negatively angled to lesser extent than said flanks facing in the opposite axial direction, and
   (d) a second frusto-conical make-up shoulder on the box member proximate the end of one of said second and fourth thread means remote from said first make-up shoulder, said first and second shoulders being positively angled in axial radial planes and relative to planes normal to said axis and intersecting said shoulders, said second shoulder being adapted to be spaced from a corresponding second shoulder on the pin member on normal make-up of said box member to such pin member, said second shoulder on said box member being adapted to engage the corresponding second shoulder on the pin member in the event of sufficient coining of said first frusto-conical make-up shoulder on the box member and of said first corresponding first make-up shoulder on the pin member.

6. The box member of claim 5 wherein said first make-up shoulder on the box member defines a positive angle of about 5° in said planes, said angle measured from another plane normal to said axis.

7. The box member of claim 6 wherein said second frusto-conical make-up shoulder defines a positive angle of about 5° in said planes, said angle measured from another plane normal to said axis.

8. The box member of claim 5 including a third frusto-conical make-up shoulder on the box member which is positively angled in axial radial planes, said angle measured from another plane normal to said axis, said second and third shoulders located at the ends of the second and fourth thread means remote from said first make-up shoulder, said first, second and third shoulders defining approximately equal positive angles in axial radial planes and relative to planes normal to said axis and which intersect said shoulders.

* * * * *